United States Patent Office 2,820,030
Patented Jan. 14, 1958

2,820,030

CERTAIN 16,17-OXIDO-STEROIDS OF THE $C_{21}$ SERIES

Percy L. Julian, Oak Park, Edwin W. Meyer, Chicago, and Isabelle Waller, Northbrook, Ill., and William J. Karpel, deceased, late of Chicago, Ill., by Ruth Betty Karpel, legal representative, Chicago, Ill., assignors to The Glidden Company, Cleveland, Ohio, a corporation of Ohio No Drawing. Original application February 8, 1950, Serial No. 143,146. Divided and this application February 21, 1957, Serial No. 641,767

6 Claims. (Cl. 260—239.55)

The present invention relates to intermediates useful for preparing 21-hydroxy-20-keto-17-oxygenated pregnenes and pregnanes.

Practically all of the known methods for preparing steroids having the group I involve the reaction of osmium tetroxide with compounds containing the grouping II. This gives rise to substances having the grouping III, which must then be oxidized

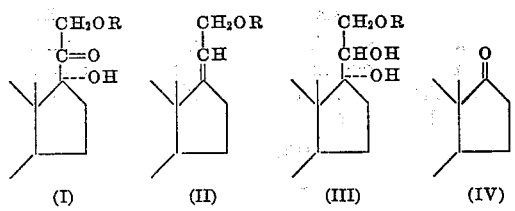

with chromic acid to secure compounds containing the desired grouping I. The latter results from such an operation in relatively poor yields, however, most of the material being converted into substances bearing the grouping IV.

One method devised to eliminate this wasteful oxidation, Sarrett, J. A. C. S., 70, 1454 (1948), involves addition of osmium tetroxide to the system V, which adduct loses the elements of hydrogen cyanide to give the grouping I.

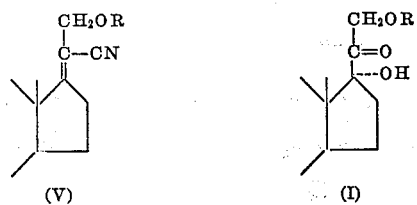

Osmium tetroxide is an expensive reagent, and, after use the osmium must be recovered and reconverted into the tetroxide if anything approaching economy is to be achieved. Moreover, the groupings II and V are themselves obtainable only by tedious processes. One of the commonly used methods, for example, for obtaining the grouping II is represented by the transformation involving the skeleton Formulae VI, VII, VIII, IX and II.

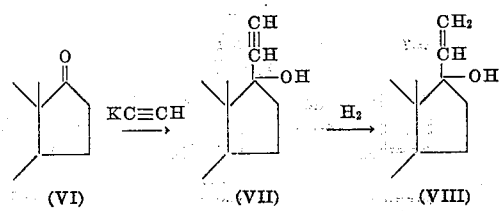

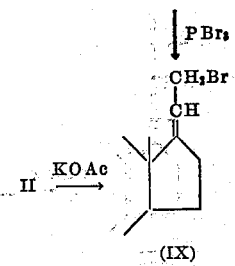

The multiplicity of steps and the tedious care involved in difficult reactions make it greatly desirable to obtain a simpler process for obtaining compounds bearing the grouping I. Thus, for example, large quantities of liquid ammonia and explosive potassium are involved in the transformation from VI to VII. Also greatest care must be exercised in the partial catalytic hydrogenation of VII to VIII.

Still a further disadvantage of the procedures outlined above resides in the necessitous preparation, as starting material, of compounds containing either the system X or XI, both of which are difficult to obtain except in very meager yields.

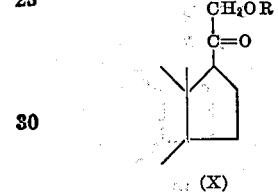

Recently great attention has been directed to 3-keto-$\Delta^4$ compounds containing in addition the grouping I, because of the discovery that Kendall's compound E of the Formula Ia represents the first therapeutic agent found that definitely alleviates the pains and accompanying symptoms of rheumatoid arthritis. It therefore becomes of universal interest to seek intermediates which may simplify the preparation of Compound E and related substances, spare precious raw material and make them available at reduced costs.

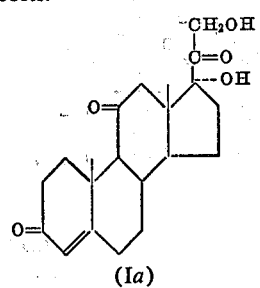

(Ia)
Kendall's compound E

It is therefore an object of the present invention to provide intermediates, useful for preparing substances bearing the grouping I and termed 17α-hydroxy-corticosteroids.

Other objects will be apparent from the following description.

It has been found that the 17α-hydroxy steroids of the type of Kendall's compound E and Reichstein's compound S may be obtained from readily available 17-acetyl steroids. The starting materials for this type of synthesis are compounds containing the grouping XII; namely, 17-acetyl-16,17-dehydrosteroids. The compounds containing the grouping XII are readily converted into the corresponding 16,17α-oxido compounds containing the grouping XIII by treatment with perbenzoic acid. Where the initial starting materials are 5,16-pregnadienes, such as may be obtained by degradation of the side chain of diosgenin, and it is desirable to retain the 5–6 double bond in the 16,17-oxido compound, the procedure described in Patent No. 2,686,181, dated August 10, 1954, may be employed. In the case of 16-pregnenes, however, such as may be obtained from sarsasapogenin, simple treatment of the pregnene with perbenzoic acid in a manner well known in the art is sufficient.

We have now found that oxido compounds containing the grouping XIII, on treatment with hydrobromic acid, suffer rupture of the oxido ring to produce 16-bromo-17α-hydroxy compounds containing the grouping XIV. On treatment of structure XIV with bromine in an appropriate solvent, compounds containing the structure XV result. On treatment of XV with a metallic salt of a carboxylic acid, such as potassium or sodium acetate, formate, benzoate, etc. in acetone, acetic acid or other suitable solvent, the 21-bromo group is replaced by an acyloxy group and the oxido structure is regenerated, resulting in compounds containing the structure XVI.

The attainment of structure XVI is a most novel and far-reaching development in the steroid field, for a relatively simple and inexpensive procedure has herewith been developed for introduction of the ketol side chain and the 17α-hydroxy group into steroids. Thus, treatment of compounds containing the grouping XVI; namely, that of a 21-acyloxy-16,17α-oxido structure, with lithium aluminum hydride, such as is described in Patent No. 2,662,904, dated December 15, 1953, leads smoothly to 17α,20,21-trihydroxy steroids (XVII), which compounds are of extreme therapeutic significance. Moreover, protection of the 20-keto group by cyclic ethylene ketal formation, such as has been described in Patent No. 2,686,181, followed by reduction with lithium aluminum hydride and acid hydrolysis, leads to compounds containing the structure XVIII. Another method of introducing this structure is to treat the compounds possessing the structure XVI with HBr to open up the oxido ring and form the structure XIX, and to then simply treat with standard Raney nickel in alcohol to form XVIII. Compounds of the structure XVIII are represented by both Kendall's compound E and Reichstein's compound S, which have recently been demonstrated to be therapeutically important steroids.

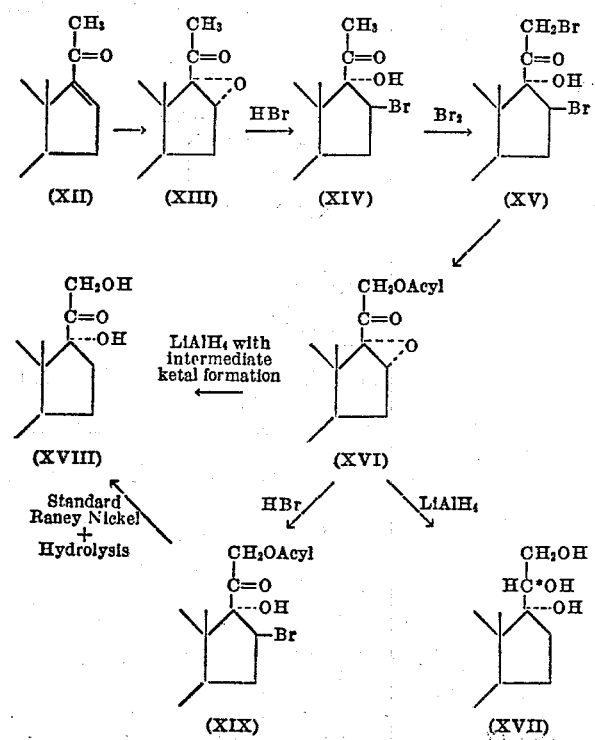

*Indicates epimers.

Thus, a novel and economical method has been achieved for the preparation of 17α-hydroxy steroids containing the 20,21-ketol side chain. Likewise, a novel and relatively inexpensive method has been achieved for obtaining compounds containing the 17α-hydroxy group as well as hydroxyl groups at positions 20,21.

In a specific illustration of this procedure, such as would be achieved in starting with 5,16-pregnadiene-3β-ol-20-one acetate of the Formula XX, the bromo compound corresponding to XV above would have the structure represented by XXI. Naturally, such a compound, before treatment with potassium acetate in acetone to produce compounds containing the structure corresponding to XVI, must be dehalogenated at positions 5 and 6 of the steroid nucleus. This is accomplished by treatment with sodium iodide and leaves compounds of the structure represented by XXII, see Patent No. 2,667,498, dated

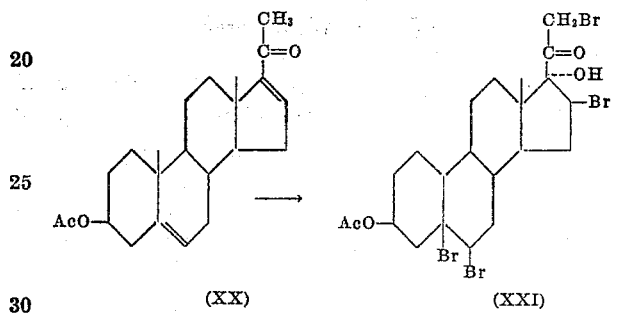

(XX)            (XXI)

January 26, 1954. The treatment of XXII with potassium acetate in acetone can now be carried out smoothly to give in excellent yield the 16,17-oxido-5-pregnene-3,21-diol-20-one,3,21-diacetate, XXIII

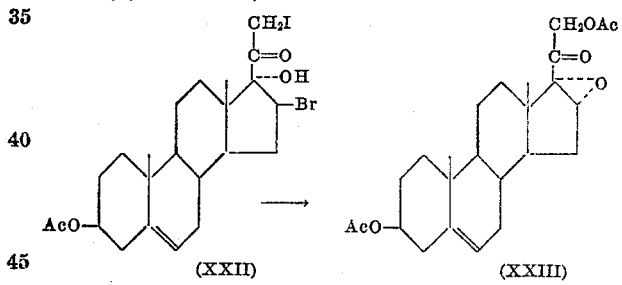

(XXII)            (XXIII)

The following examples will serve to illustrate the invention.

EXAMPLE 1

*The preparation of a tetrabromide from 16,17-oxido-5-pregnene-3β-ol-20-one acetate*

A solution of one gram of 16,17α-oxido-pregnenolone acetate in 10 ml. of acetic acid was treated with a solution of 0.430 g. of bromine in 4.30 ml. of acetic acid at room temperature. After the bromine color had all disappeared, 1.5 ml. of 30% HBr in acetic acid and 10 ml. of carbon tetrachloride was added, and the mixture was allowed to stand at room temperature for one-half hour. An additional 0.430 g. of bromine in 4.30 ml. of acetic acid was then added. After standing for 1½ hours at room temperature, the bromine color had disappeared. The carbon tetrachloride was removed in vacuo and the remaining acetic acid solution was poured into water. The crystalline precipitate was filtered, washed well with water and air dried. 1.79 g., M. P. 145°–147° dec.

EXAMPLE 2

*Preparation of 16,17-oxido-5-pregnene-3β,21-diol-20-one diacetate*

The tetrabromide from Example 1 was dissolved in 25 ml. of benzene and a solution of 4.0 g. of sodium iodide in 25 ml. of ethanol was added. This mixture was allowed to stand at room temperature for 20 hours, and then poured into a large volume of ether and water. The ether layer was washed with dilute sodium thiosulfate and water, dried and concentrated in vacuo to a tan solid residue. The total crude product was dissolved in 30 ml. of acetone, and 3.00 g. of freshly fused potassium acetate was added. The mixture was refluxed for three hours, the acetone was removed by distillation and the residue was diluted with water and extracted with ether. The ether layer was washed with water to neutrality, dried and concentrated to dryness. The solid residue was crystallized from methanol. 630 mg., M. P. 175°–176°.

*Analysis.*—Calc. for $C_{25}H_{34}O_6$: C=69.74; H=7.96. Found: C=69.83; H=8.01.

EXAMPLE 3

*Preparation of 21-benzoxy-16,17-oxido-5-pregnene-3β-ol-20-one acetate*

A solution of 2.14 g. of the tetrabromide of 16,17α-oxido-pregnenolone, prepared as in Example 1, in 30 ml. of benzene was treated with a solution of 4.00 g. of sodium iodide in 30 cc. of ethanol. The reaction mixture was allowed to stand at room temperature for 20 hours and then poured into a large volume of ether and water. The ether layer was washed with sodium thiosulfate and water, dried, and concentrated in vacuo to a tan solid. The total crude product was dissolved in 30 ml. of acetone, and 3.0 g. of potassium benzoate was added. The mixture was refluxed for 3 hours, the acetone was removed by distillation and the residue was diluted with water and extracted with ether. The ether layer was washed with water to neutrality, dried and concentrated to dryness. The solid residue was crystallized from chloroform-methanol. 710 mg., M. P. 189°–190°, softens 180°.

*Analysis.*—Calc. for $C_{30}H_{36}O_6$: C=73.14, H=7.36. Found: C=72.94, H=7.57.

EXAMPLE 4

*The bromination of 16,17-oxido-5-pregnene-3β-ol-20-one in acetic acid*

A solution of one gram of 16,17α-oxido-pregnenolone in 10 ml. of acetic acid was treated with 0.485 g. of bromine in 4.85 ml. of acetic acid at room temperature. After the bromine color had all disappeared, 1.5 ml. of 30% HBr in acetic acid and 15 ml. of carbon tetrachloride was added. A precipitate appears which goes back into solution on standing. After one-half hour at room temperature an additional 0.485 g. of bromine in 4.85 cc. of acetic acid was added. After standing for one hour at room temperature, the bromine color had disappeared. The carbon tetrachloride was removed in vacuo and the acetic acid solution was poured into water. The crystalline precipitate was filtered, washed well with water and air dried. 2.14 g., M. P. 145–147° dec. There was no depression in melting point on admixture with the product from Example 1; therefore, acetylation at position 3 has taken place in acetic acid in the presence of HBr. The product when treated as in Example 2 yield 16,17-oxido-5-pregnene-3β,21-diol-20-one diacetate, or when treated as in Example 3, 21-benzoxy-16,17-oxido-5-pregnene-3β-ol-20-one acetate is obtained.

EXAMPLE 5

*Treatment of 16,17-oxido-pregnane-3-ol-20-one acetate*

To a solution of 1 gram of 16,17-oxido-pregnane-3-ol-20-one acetate in 10 ml. of acetic acid is added 1.5 ml. of 30% HBr in acetic acid and 15 ml. of carbon tetrachloride. After one-half hour at room temperature there is added 0.430 g. of bromine in 4.30 ml. of acetic acid. The mixture is allowed to stand at room temperature until the bromine color disappears. The carbon tetrachloride is then removed in vacuo and the acetic acid solution poured into water, the precipitate filtered, washed well with water and dried. The crude dibromide is then taken up in acetone and 3.0 g. of freshly fused potassium acetate added and the mixture refluxed for three hours. The reaction mixture is then worked up as in Example 2.

EXAMPLE 6

*16,17-oxido-5-pregnene-3β,21-diol-20-one 21-monoacetate*

A solution of 10.0 g. of 16,17-oxido-5-pregnene-3β-ol-20-one acetate in 100 ml. of acetic acid and 100 ml. of carbon tetrachloride, chilled to 18°, was treated with a solution of 4.3 g. of bromine in 30 ml. of carbon tetrachloride. Upon complete decolorization, there was added 15 ml. of a 32% solution of hydrobromic acid in acetic acid. After the solution had stood for ten minutes at room temperature, a second molar equivalent of bromine, 4.3 g. in 30 ml. of carbon tetrachloride, was added portionwise at room temperature with stirring during a forty-minute period. The reaction mixture was allowed to stand for an additional fifteen minutes and then evaporated in vacuo with a minimum of heating to remove the carbon tetrachloride. The remaining suspension was poured into water, filtered and the separated solid washed with water and dried at 40°. The solid, 17.9 g., was dissolved in 75 ml. of benzene and 175 ml. of methanol, and after the addition of 5.2 g. of hydrogen bromide in 15 ml. of methanol, the solution was allowed to stand at room temperature for ten hours. The ethereal extract of the reaction mixture which had been diluted with water was washed with water, dried, concentrated to 20 ml. and diluted with 155 ml. of benzene. After the addition of a solution of 36.5 g. of sodium iodide in 175 ml. of absolute ethanol, the mixture was allowed to stand at room temperature for twenty-two hours. It was then diluted well with water and extracted with ether. The ether extract was washed with 3% sodium thiosulfate solution and then with water. The cream-colored residue (14.5 g.) remaining after removal of ether in vacuo was dissolved in 300 ml. of acetone containing 42 g. of freshly-fused potassium acetate. The mixture was refluxed for four and one-half hours, then concentrated to a small volume, diluted with water and extracted with ether. The water-washed and dried ethereal solution gave upon concentration to a small volume, 5.5 g. of 16,17-oxido-5-pregnene-3β,21-diol-20-one 21 - monoacetate melting at 180–188°. A reslurry of the monoacetate in ether yielded 5.0 g. of material melting at 188–190°. Further recrystallization from acetone gave needles melting at 190–192°. $\alpha_D^{24}+14.9°$ (8.7 mg. made up to 2 ml. with chloroform, $\alpha_D+0.065°$, 1, 1 dm.).

*Analysis.*—Calc. for $C_{23}H_{32}O_5$: C=71.11; H=8.30. Found: C=70.86; H=8.33.

EXAMPLE 7

*16,17-oxido-4-pregnene-21-ol-3,20-dione acetate*

A solution of 6.5 g. of aluminum isopropoxide in 60 ml. of toluene was added dropwise during five minutes to a refluxing solution of 15.0 g. of 16,17-oxido-5-pregnene-3β,21-diol-20-one 21-monoacetate in 600 ml. of toluene. The mixture was refluxed for an additional one-half hour, and after the addition of 3 ml. of acetic acid in 20 ml. of toluene, it was steam distilled. The crystalline residue was dissolved in ether and washed with 1% sulfuric acid, 1% sodium hydroxide solution and then with water to neutrality. Addition of petroleum ether, B. P. 35–60°, to the dried and concentrated (60 ml.) ethereal solution gave 9.0 g. of 16,17-oxido-4-pregnene-21-ol-3,20-dione acetate in clusters of needles melting at 168–170°. From the mother liquor there was secured an additional 1.5 g. of material melting at 165–168°. Several recrystallizations from ether-petroleum ether, B. P. 35–60°, gave prisms melting at 170–172°. $\alpha_D^{25}+166.8°$ (7.1 mg. made up to 2 ml. with chloroform, $\alpha_D+0.592°$, 1, 1 dm.).

*Analysis.*—Calc. for $C_{23}H_{30}O_5$: C=71.48; H=7.82. Found: C=71.82; H=8.23.

EXAMPLE 8

17α-hydroxy-11-desoxycorticosterone acetate

A solution of 20 ml. of 32% hydrobromic acid in acetic acid was added to a solution of 20.0 g. of 16,17-oxido-4-pregnene-21-ol-3,20-dione acetate in 100 ml. of acetic acid and chilled to 15–18°. The solution, red-brown in color, was held for fifteen minutes at room temperature and then cooled to 18° for an additional fifteen minutes. The crystalline bromohydrin (23.5 g.), which separated within two to three minutes on chilling, was filtered, washed well with alcohol-free ether and dried in vacuo at 40°. A sample of the bromohydrin when recrystallized from benzene-ether formed needles melting at 177–178°, dec.

Analysis.—Calc. for $C_{23}H_{31}O_5Br$: C=59.10; H=6.73. Found: C=59.26; H=7.05.

A solution of 23.5 g. of the bromohydrin in 750 ml. of ethanol was stirred and refluxed with 98 g. of Raney nickel [1] for five hours, and then filtered while hot through a bed of filter-aid. The pale yellow filtrate was concentrated in vacuo to a slurry of needle-like crystals and chilled. The white solid was filtered and washed with 100 ml. of cold acetone. After drying at 65°, there was obtained 12.5 g. of 17α-hydroxy-11-desoxycorticosterone acetate melting at 226–231°. Recrystallization from acetone raised the melting point to 235–238° (sinters 230°). This material showed no depression in melting point when admixed with a sample of the acetate of 17α-hydroxy-11-desoxycorticosterone isolated from a natural source. $\alpha_D^{24}$+114° (11.2 mg. made up to 5 ml. with acetone, $\alpha_D$+0.255°, 1, 1 dm.).

Analysis.—Calc. for $C_{23}H_{32}O_5$: C=71.11; H=8.30. Found: C=70.94; H=8.28.

An additional small crop of crude material was recovered from the original mother liquor. The mother liquor was diluted with water, extracted with ether and washed with 1% sodium hydroxide solution and with water. The dried ethereal solution was concentrated to a gummy residue, which upon recrystallization from acetone gave 880 mg. of material melting at 195–220°.

EXAMPLE 9

17α-hydroxy-11-desoxycorticosterone

A solution of 500 mg. of 17α-hydroxy-11-desoxycorticosterone acetate in 75 ml. of methanol containing 500 mg. of potassium bicarbonate in 10 ml. of water was allowed to stand at room temperature for twenty-four hours. It was then diluted with saline solution and extracted with freshly distilled ether. The ether solution was washed with water to neutrality, dried and concentrated to 10 ml. After chilling, the separated solid was filtered and washed with cold ether. There resulted 290 mg. of fine, glistening plates melting at 200–208°.

Recrystallization of this material from acetone raised the melting point to 207–208°.

Many variations can be carried out in this type of preparation, as should be obvious to one experienced in the art. Thus, compounds of the type XXIII can be converted into 20-cyclic ethylene ketals before lithium aluminum hydride reduction. Hydrolysis after lithium hydride treatment will then lead to 17α,21-hydroxy-20-keto compounds. Where a 16,17-oxido-pregnane is the starting material, it is, of course, not necessary to treat with sodium iodide, since removal of bromine from a 5,6-dibromide is not necessary, and the 16,17-oxido compound can be treated directly with HBr and bromine and the resulting dibromide treated with potassium acetate in acetone or other solvent. Replacement of the 21-bromine atom of the saturated compound with iodine can, of course, be resorted to if desired, and the resulting 21-iodo compound treated with potassium salt.

Also it is not essential to start with acetylated 3-hydroxy compounds where such are used. In the case of unsaturated oxido compounds, however, bromination in acetic acid is convenient for the bromination, and under these conditions acetylation occurs. Other esters such as the formate, benzoate, etc. can be employed as starting material if the acetate is undesirable, and if the —OH group is to be retained unesterified, the bromination can be carried out under non-acetylating conditions. However, it is preferred to start with acylated 3-hydroxy compounds and then to restore the 3-OH group after introduction of the 21-halo group and before formation of the 21-acyloxy group. This can be done by subjecting the 3-acyloxy-21-halo compound to a mild hydrolysis with HBr in methyl alcohol, as shown in Example 6. Where the compounds also contain a 5,6-dibromo grouping, the hydrolysis can take place either before or after removal of the 5,6-bromine atoms and replacement of the 21-bromine atom with iodine. Likewise, other salts than the acetate and benzoate, such as the propionate and the like, can be employed for replacement of the 21-halogen atom and for restoration of the 16,17-oxido group.

Also many other pregnenes and pregnanes can be used in the present invention. Thus, pregnenes and pregnanes possessing an oxygenated function, such as keto, hydroxy and acyloxy groups, at the 11- or 12-position of the nucleus can be treated to form the 21-hydroxy-17-oxygenated derivatives. Starting compounds oxygenated in ring C can, for example, be prepared from bile acids, such as desoxycholic acid, by degradation of the side chain and formation of a $\Delta^{16}$ double bond, by known methods, such as that of Butenandt et al., Ber. 71, 1487 (1938); 72, 182 (1939). Where an 11-oxygenated compound is desired, the transposition can be carried out either after the degradation of the side chain or after the reactions here described have been carried out.

It is thus seen that intermediates are provided which are useful for producing 17α-hydroxy-21-hydroxy pregnenes and pregnanes from steroids which do not possess these groupings without the use of expensive and/or dangerous reagents. Since the starting materials are much more readily available than the natural substances containing such groupings, this invention assumes particular significance in view of the widespread interest in such hydroxylated steroids in the treatment of rheumatoid arthritis.

This application is a division of Serial No. 143,146, filed February 8, 1950.

Having described the invention, what is claimed is:

1. A steroid selected from the class consisting of 16,17-oxido-5-pregnene-3,21-diol-20-one, the acylates of 16,17-oxido-5-pregnene-3,21-diol-20-one in which the acyloxy group is the acyloxy group of a lower hydrocarbon carboxylic acid containing not more than seven carbon atoms, 16,17-oxido-4-pregnene-21-ol-3,20-dione and the esters of 16,17-oxido-4-pregnene-21-ol-3,20-dione with lower hydrocarbon carboxylic acids containing not more than seven carbon atoms.

2. 16,17-oxido-5-pregnene-3,21-diol-20-one diacetate.

3. 16,17-oxido-5-pregnene-3,21-diol-20-one 21-monoacetate.

4. 16,17-oxido-4-pregnene-21-ol-3,20-dione acetate.

5. The 3,21-diesters of 3,21-dihydroxy-16,17-oxido-20-keto-5-pregnene with lower hydrocarbon carboxylic acids containing not more than seven carbon atoms.

6. A 21-monoester of 3,21-dihydroxy-16,17-oxido-20-keto-5-pregnene with a lower hydrocarbon carboxylic acid containing not more than seven carbon atoms.

[1] Reactions of Hydrogen, Adkins, Univ. of Wisconsin Press, Madison, Wisconsin (1937).

No references cited.